United States Patent [19]
Streil et al.

[11] Patent Number: 5,993,664
[45] Date of Patent: Nov. 30, 1999

[54] METHOD FOR PRODUCING A MATERIAL FOR HEAVY METAL ABSORPTION OR FOR ANALYTICALLY DETECTING HEAVY METALS

[75] Inventors: Thomas Streil, Ebereschenstrasse 18, 01169; Wolfram Grundke, both of Dresden; Günther Just, Leipzig, all of Germany

[73] Assignee: Thomas Streil, Dresden, Germany

[21] Appl. No.: 08/776,346

[22] PCT Filed: Jul. 17, 1995

[86] PCT No.: PCT/EP95/02796

§ 371 Date: Jul. 21, 1997

§ 102(e) Date: Jul. 21, 1997

[87] PCT Pub. No.: WO96/03755

PCT Pub. Date: Feb. 8, 1996

[30] Foreign Application Priority Data

Jul. 25, 1994 [DE] Germany ............................ 44 26 266

[51] Int. Cl.⁶ .................................. G21F 9/12; C02F 1/42
[52] U.S. Cl. ........................ 210/688; 427/255; 427/443.2; 436/57; 436/82; 502/402; 502/407; 502/439; 502/509; 502/527.15
[58] Field of Search .................................. 210/688, 912; 427/255, 443.2; 436/57, 73, 82–84; 502/402, 406, 407, 439, 509–511, 527.15, 527.17

[56] References Cited

U.S. PATENT DOCUMENTS

| | | | |
|---|---|---|---|
| 3,900,422 | 8/1975 | Terajima et al. | 502/402 |
| 3,997,483 | 12/1976 | Wurster et al. | 502/402 |
| 4,097,376 | 6/1978 | Wegmuller et al. | 502/402 |
| 4,550,034 | 10/1985 | Shimrock et al. | 427/443.2 |
| 4,764,498 | 8/1988 | Wissner et al. | 502/407 |
| 4,876,232 | 10/1989 | Barkatt | 210/688 |
| 5,126,272 | 6/1992 | Kingston et al. | 436/82 |
| 5,173,263 | 12/1992 | Lee | 436/73 |
| 5,434,331 | 7/1995 | Barkatt et al. | 210/688 |
| 5,668,079 | 9/1997 | Tavarides et al. | 502/407 |
| 5,695,882 | 12/1997 | Rosenberg | 210/688 |

FOREIGN PATENT DOCUMENTS

| | | |
|---|---|---|
| 532919 | 3/1993 | European Pat. Off. . |
| 2644772 | 9/1990 | France . |
| 291543 | 7/1991 | German Dem. Rep. . |
| 38 29 654 | 3/1990 | Germany . |
| 52-045156 | 4/1977 | Japan . |
| 52-123550 | 10/1977 | Japan . |
| 58-45116 | 3/1983 | Japan . |
| 58-166934 | 10/1983 | Japan . |
| WO 90/11826 | 10/1990 | WIPO . |

OTHER PUBLICATIONS

International Search Report –German.
International Examination Report –English.

*Primary Examiner*—Thomas G. Wyse
*Attorney, Agent, or Firm*—Wolf, Greenfield & Sacks, P.C.

[57] ABSTRACT

A method for producing a material for heavy metal absorption or for analytically detecting heavy metals, especially uranium and radium, comprises the steps of: providing a material containing nitrogen which is organically bonded in a polymer; treating said material with potassium permanganate in an alkaline solution; and treating the material with iron(II) hydroxide in an alkaline solution. The material produced in this way is suitable for being used for a method of analytically detecting heavy metals and heavy metal istopes in a sample liquid as well as for a method of cleaning contaminated liquids.

15 Claims, No Drawings

METHOD FOR PRODUCING A MATERIAL FOR HEAVY METAL ABSORPTION OR FOR ANALYTICALLY DETECTING HEAVY METALS

FIELD OF THE INVENTION

The present invention refers to a method for producing a material for heavy metal absorption or for analytically detecting heavy metals, especially uranium and radium.

DESCRIPTION OF THE PRIOR ART

Among those skilled in the art, it is known that woollen threads, or non-woven filter fabrics, dyed with potassium permanganate, or layers of various materials absorb radium. The absorption behaviour depends to a decisive extent on the material used. This property was already described by Mrs. Marie Curie in connection with the production of her radium preparations.

The knowledge of the actual interaction between the heavy metals and the organic complexing agents after the permanganate treatment has not yet been fully clarified up to now.

Attempts to enrich uranium in a similar manner are also known from the prior art.

An effective enrichment and storage of heavy metals that are highly detrimental to the environment and of other heavy metals in one layer have not been known up to now.

SUMMARY OF THE INVENTION

It is therefore a major object of the present invention to provide a method for producing a material for heavy metal absorption or for analytically detecting heavy metals, which permits the material to absorb and store heavy metals with high efficiency.

This object is achieved by a method for producing a material for heavy metal absorption or for analytically detecting heavy metals, especially uranium and radium, comprising the steps of:

a) providing a material containing nitrogen which is organically bonded in a polymer;

b) treating said material with potassium permanganate in an alkaline solution; and c) treating the material with iron(II) hydroxide in an alkaline solution.

The present invention is based on the finding that a formation of manganese and iron penetration complexes takes place, when the material, which contains nitrogen that is organically bonded in a polymer, is treated in the manner described hereinbefore. Together with the nitrogen-functional groups of the polymers used (nitrile and amido groups, respectively), these manganese and iron penetration complexes bind uranium or radium with high efficiency.

According to one aspect of the present invention, a method for analytically detecting heavy metals and heavy metal isotopes in a sample liquid is provided, said method using the material produced in accordance with the present invention and comprising the following method steps:

introducing the material into the sample liquid for a predetermined period of time, said sample liquid having a predetermined pH range and temperature range;

removing the material from the sample liquid; and alpha-spectrometrically evaluating the components which the material has absorbed from the sample liquid and stored.

According to a further aspect of the present invention, a method for cleaning contaminated liquids is provided, said method using the material produced in accordance with the present invention and comprising the following method steps:

introducing the material into the contaminated liquid, the water having a predetermined temperature so as to make the chemical reaction take place;

removing the material as soon as it has reached saturation; and disposing of the saturated material.

One advantage of this method is that surfaces consisting of specially produced polymers as well as those consisting of recycling material or polymer waste material are suitable for this method.

It follows that large amounts of special solid waste of the polymers polyacryl, polyamide and polyurethane, which are deposited on waste dumps and the hydrolysis of which results in the formation of dangereous substances, can be utilized in a useful manner; this is an important contribution to environmental protection and to the disposal of detrimental waste material.

DESCRIPTION OF PREFERRED EMBODIMENTS OF THE INVENTION

A more detailed description of preferred embodiments of the present invention follows hereinbelow.

Prior to describing special embodiments in the case of which the material according to the present invention is used in various applications, the production of this material as well as the properties thereof will be described in the following.

After providing a material containing nitrogen which is organically bonded in a polymer, this material is first treated with potassium permanganate in an alkaline/basic solution and subsequently with iron(II) hydroxide again in an alkaline solution. The material used at the beginning can, for example, be acrylonitrile or polyamide.

For demonstrating the effect of the material which has been produced in the manner described hereinbefore, an example where the material according to the present invention is used for cleaning a contaminated sample will be described hereinbelow.

Assuming, for example, the use of a sensitive polyacryl layer which has a thickness of 0.7 $\mu$m and a surface area of 4 square centimeters and which has been produced in accordance with the method described hereinbefore. This layer is suitable for absorbing from 100 ml of a sample liquid with an activity of 2 Bq/l uranium or 100 Bq/l radium 70 percent of said uranium and radium after one day reaction time at a pH range of 6 to 8 and at a temperature of 25° Celsius, and it is suitable for storing said uranium and radium.

This process is very easily reproducable and until the layer is saturated there is a linearity to the offered initial concentration of the sample.

The properties of the material according to the present invention are, however, not limited to the cleaning of contaminated liquids, but they also permit an analytic detection, i.e. a quantitative determination, of heavy metals. The material according to the present invention cannot only be used for the above-described uranium and radium but also for other heavy metals and their isotopes, such as polonium, bismuth, lead and other elements of the actinium series having similar chemical properties, such as plutonium, actinium and protactinium of the natural and artificial radioactive families.

In the following, a method of analytically detecting heavy metals in a sample liquid is described. This method comprises the steps of introducing the material according to the present invention into the sample liquid for a predetermined period of time, said sample liquid having a predetermined pH range and temperature range; removing the material from the sample liquid; and alpha-spectrometrically evaluating the components which the material has absorbed from the sample liquid and stored.

In accordance with a preferred embodiment, the pH value of the sample liquid is in the range of approx. 6 to 8 and is adjusted by introducing carbon dioxide or ammonia into said sample liquid.

In the following, some devices will be described, which are suitable for use with the material according to the present invention in connection with a method for analytically detecting heavy metals.

In the case of a first device, the material, which contains nitrogen that is organically bonded in a polymer, is applied to a silicon wafer by spinning before it is subjected to a chemical treatment; following this it is chemically treated. In so doing, the starting material used is e.g. polyacrylonitrile or polyamide, which is applied by spinning as a very thin homogeneous layer having a thickness of less than 1 $\mu$m. The silicon wafer used in this embodiment is an oxidized silicon wafer which has been subjected to surface finishing.

After the production and the chemical treatment of the very thin homogeneous layer of polyacrylonitrile or polyamide, chips having a desired size are cut out of the silicon wafer with a saw. In connection with this embodiment, the desired size is 2 cm by 2 cm.

When the method of analytical detection described hereinbefore is carried out, a chip is exposed to a sample liquid having a pH value between 6 and 8 at a fixed temperature and for a fixed period of time, whereupon it is alpha-spectrometrically evaluated.

Another device that is suitable for use with this method is produced by applying a very thin homogeneous sensitive layer directly to an alpha-sensitive detector system. This detector system comprises e.g. an intelligent silicon microsystem containing in addition to the sensitive elements also the processing electronics on the chip. Such an arrangement is also referred to as micro-alpha spectrometer.

By means of such a system, concentration changes can continuously be detected directly in the sample liquid. If the homogeneous sensitive layer should reach its saturation concentration, it will be removed from the system and the system will be re-activated by applying a non-saturated layer.

In accordance with a further embodiment, the very thin homogeneous sensitive layer, which is produced directly on the microsystem, can be replaced by a thin homogeneous sensitive layer, which is produced in the form of a self-supporting film and which is then attached to the microsystem, for example. An adavantage of this film is to be seen in the fact that it can be replaced very easily.

If a predetermined sensitivity is desired for a specific case of use, this sensitivity can be adjusted in that, during the production of the material according to the present invention, the chemical treatment is carried out with the aid of a specific process design after the deposition of the material, which contains nitrogen that is organically bonded in a polymer, as a thick layer or surface. The process design is of such a nature that the chemical sensitization takes place only down to a depth (a few $\mu$m) that is given by a predetermined alpha-spectrometric resolution.

It is apparent that the resolution of these layers is lower than that of the layers on highly polished silicon having a thickness of less than 1 $\mu$m, which has been described hereinbefore.

By means of the method described, it is possible to detect e.g. uranium and radium concentrations of 1 mBq/l using 100 ml sample liquid. The preparing and measuring times are in the range of up to 48 hours in this case.

When the sensitive layer has a thickness of 0.7 $\mu$m and a surface area of 4 square centimeters, the saturation concentration for uranium is about 4 Bq/l, the amount of sample liquid used being 100 ml. For radium this saturation concentration exceeds 1000 Bq/l by far.

In the following, a further aspect of the present invention will be described. This aspect concerns the method of cleaning contaminated liquids by means of the material according to the present invention. Said method comprises the steps of introducing the material into the contaminated liquid, the water having a predetermined temperature so as to make the chemical reaction take place; removing the material as soon as it has reached saturation; and disposing of the saturated material.

Surfaces which are suitable for this method are surfaces consisting of specially produced polymers as well as those consisting of recycling material or polymer waste material An important prerequisite for this method is that the material has a very large surface Materials having such a large surface are e.g. fibres, non-woven fabrics, rags or foamed materials.

Particularly economical is, apparently, the utilization of waste materials consisting of polyacrylonitrile, polyamide and polyurethane, which must be treated as special solid wastes.

In accordance with the production method according to the present invention, these materials are chemically treated and, consequently, activated.

According to one embodiment, the cleaning process can take place in a multistep process depending on the initial concentration. When a two-step process is used, said process can, for example, comprise a fine-cleaning step and a coarse-cleaning step. Using a residence time of up to 48 hours and an ambient temperature of 25° Celsius, the activated surfaces are, for example, capable of absorbing up to 90 percent of the uranium or radium of the concentration contained in the contaminated liquid. It is thus possible to offer in the coarse-cleaning step a uranium/radium concentration of down to 10 Bq/l and to reduce then in the fine-cleaning step an initial concentration of 1 Bq/l to 0.1 Bq/l.

It is obvious that the use of the multistep processes depends on the concentration of the heavy metals contained in the contaminated liquid.

It is obvious that the method cannot only be applied to small quantities of contaminated liquid, but that also conventional clearing basins may be used as reaction vessels, which are heated in winter so as to make the chemical reaction take place.

Furthermore, the cleaning can be carried out continuously in accordance with one embodiment. For this purpose, the activated polymers (in the form of fibres, rags, foamed materials or the like) are moved by means of a special device very slowly in a long reaction channel in a kind of counter-flow in a direction opposite to the flow direction of the liquid. When the activated polymers have reached the flow-in area of the liquid, i.e. the point at which the highest concentration is present, the polymers are removed from the process, after having reached the saturation concentration, as charged and chemically inactive material.

The polymers having the highest chemical activity are always added to the liquid having the lowest concentration.

In accordance with a preferred embodiment of the present invention, the contaminated liquid is water.

The polymers charged with the heavy metals are burnt in a high-temperature plant, this type of plant being normally used for special solid waste incineration. Depending on the degree of contamination, the highly active heavy metals, especially uranium and radium remain as incineration residue in the ashes in a highly enriched form.

These ashes can then be used for recovery of uranium or for isotope production or they can finally be disposed of.

As can be seen from the description, the method according to the present invention is suitable for carrying out, in a very simple manner, the decontamination of large quantities of continuously accruing pit and waste dump seeping water of former or still intact uranium mines or of mines which have been shut down.

It is obvious that this method can also be used in the vicinity of mixed waste disposal sites for cleaning the ground water or for cleaning the drinking water in the vicinity of geological abnormalities or in the vicinity of areas which have been contaminated by mining.

Furthermore, this method permits a recovery of uranium from lean ores by enriching the uranium from the solution.

We claim:

1. A method for producing a material for heavy metal absorption or for analytically detecting heavy metals, including uranium and radium, comprising the steps of:
   a) providing a material containing nitrogen which is organically bonded in a polymer;
   b) treating said material with potassium permanganate in an alkaline solution; and
   c) treating the material with iron(II) hydroxide in an alkaline solution.

2. A method according to claim 1, wherein the material provided in method step a) comprises acrylonitrile or polyamide.

3. A method according to claim 1, wherein subsequent to method step a) and prior to method step b) the material is applied to a silicon wafer.

4. A method according to claim 3, wherein:
   the silicon wafer is surface-finished and oxidized;
   the material is applied by spinning on in the form of a very thin homogeneous layer; and
   when the silicon wafer has been finished, chips are cut out of said silicon wafer.

5. A method according to claim 1, wherein the material is produced as a thin, self-supporting film.

6. A method according to claim 5, wherein the film is applied to an alpha-sensitive detector system.

7. A method according to claim 1, wherein the material is produced as a very thin homogeneous sensitive layer on an alpha-sensitive detector system.

8. A method according to claim 6, wherein the alpha-sensitive detector system is an intelligent silicon microsystem containing in addition to sensitive elements also a processing electronics on a chip.

9. A method according to claim 1, wherein method steps b) and c) are carried out such that a chemical sensitization of the material takes place down to a predetermined depth of the material.

10. A method for analytically detecting heavy metals and heavy metal isotopes in a sample liquid by means of a material produced according to claim 1, further comprising the method steps of:
    introducing the material into the sample liquid for a predetermined period of time, said sample liquid having a predetermined pH range and temperature range;
    removing the material from the sample liquid; and
    alpha-spectrometrically evaluating the components which the material has absorbed from the sample liquid and stored.

11. A method according to claim 10, wherein the pH value of the sample liquid is in the range of approx 6 to 8 and is adjusted by introducing carbon dioxide or ammonia into said sample liquid.

12. A method according to claim 10, wherein the heavy metals or heavy metal isotopes comprise uranium, radium, polonium, bismuth, lead, plutonium, actinium and protactinium or the isotopes thereof.

13. A method for cleaning liquids contaminated by heavy metals by means of a material produced according to claim 1, comprising the steps of:
    introducing the material into the contaminated liquid, the contaminated liquid having a predetermined temperature so that a chemical reaction takes place between the material and the heavy metal;
    removing the material as soon as the reaction has reached saturation; and
    disposing of the material which has become saturated.

14. A method according to claim 13, wherein the method comprises a coarse-cleaning step and at least one fine-cleaning step.

15. A method according to claim 13, wherein the material is disposed of by high-temperature incineration.

* * * * *